United States Patent [19]

Plum

[11] Patent Number: 5,758,061
[45] Date of Patent: May 26, 1998

[54] COMPUTER SOFTWARE TESTING METHOD AND APPARATUS

[76] Inventor: Thomas S. Plum, 3 Waihona Place, Kamuela, Hi. 96743

[21] Appl. No.: 572,795

[22] Filed: Dec. 15, 1995

[51] Int. Cl.⁶ .................................................. G06F 11/00
[52] U.S. Cl. .......................... 395/183.11; 395/183.14; 395/704
[58] Field of Search .................. 395/183.01, 183.13, 395/183.14, 701, 704, 183.08, 183.11, 561, 568

[56] References Cited

U.S. PATENT DOCUMENTS

| | | |
|---|---|---|
| 3,427,443 | 2/1969 | Apple et al. |
| 3,707,725 | 12/1972 | Dellheim ........................ 395/183.14 |
| 3,955,180 | 5/1976 | Hirtle . |
| 4,205,370 | 5/1980 | Hirtle . |
| 4,423,508 | 12/1983 | Shiozaki et al. |
| 4,453,093 | 6/1984 | Boudreau ........................ 371/16.1 |
| 4,462,077 | 7/1984 | York . |
| 4,571,677 | 2/1986 | Hirayama et al. |
| 4,598,364 | 7/1986 | Gum et al. |
| 4,636,940 | 1/1987 | Goodwin, Jr. ................... 395/183.14 |
| 4,853,851 | 8/1989 | Horsch ........................... 395/183.14 |
| 4,866,665 | 9/1989 | Haswell-Smith .................. 395/183.14 |
| 4,953,084 | 8/1990 | Meloy et al. .................... 395/183.14 |
| 5,050,168 | 9/1991 | Paterson ......................... 395/183.14 |
| 5,067,073 | 11/1991 | Andrews . |
| 5,121,489 | 6/1992 | Andrews ......................... 395/183.14 |
| 5,193,180 | 3/1993 | Hastings ......................... 395/183.14 |
| 5,265,254 | 11/1993 | Blasciak et al. ................. 395/183.11 |
| 5,313,616 | 5/1994 | Cline et al. ..................... 395/183.11 |
| 5,394,544 | 2/1995 | Motoyama et al. ................ 395/183.14 |
| 5,432,942 | 7/1995 | Trainer . |
| 5,455,936 | 10/1995 | Maemura ........................ 395/183.11 |
| 5,581,696 | 12/1996 | Kolawa et al. ................... 395/183.14 |
| 5,604,895 | 2/1997 | Raimi ........................... 395/701 |
| 5,640,568 | 6/1997 | Komatsu ........................ 395/705 |
| 5,651,111 | 7/1997 | McKeeman et al. ............... 395/183.14 |
| 5,659,752 | 8/1997 | Heisch et al. ................... 395/704 |
| 5,673,387 | 9/1997 | Chen et al. ..................... 395/183.14 |
| 5,689,712 | 11/1997 | Heisch .......................... 395/183.11 |

FOREIGN PATENT DOCUMENTS 0 202 628  11/1986  European Pat. Off. ........ G06F 11/00

OTHER PUBLICATIONS

Antoine et al., "Effective Software Debugging Using a Program Tracer," *Electrical Communication*, Vol. 54 No. 2, pp. 111–114 (1979).

Morse et al., "DOS/AMAP Trace," *IBM Technical Dislosure Bulletin*, vol. 14 No. 3 (Aug. 1971).

L.D. Harward, Jr., "PL/1 Trace Program," *IBM Technical Disclosure Bulletin*, vol. 13 No. 4 (Sept 1970).

H. Ruzicka, "Special Instruction to Initiate and Supplement Program Trace Functions," *IBM Techinical Disclosure Bulletin*, vol. 12 No. 6 (Nov. 1969).

(List continued on next page.)

*Primary Examiner*—Albert Decady
*Attorney, Agent, or Firm*—Nixon & Vanderhye P.C.

[57] ABSTRACT

An automatic testing technique generates an incremental coverage report indicating coverage only for portions of the program that are unreached by previous testing—allowing software testing processes to concentrate upon finding tests which increase the test coverage and reducing the sheer bulk of the coverage output. A computer program to be tested is parsed and "instrument" code is inserted at appropriate parts of the program. The instrumented program is then typically executed multiple times with different input conditions in an attempt to "exercise" and test different parts of the program. For each execution, the instrument code inserted by the instrumentation process causes coverage results to be generated and stored. Such coverage results may include information about which parts of the program have been reached by the current execution that had not previously been reached by earlier executions. This "incremental" coverage results output is useful in specifying the value of a current test without flooding the user with volumes of information specifying all parts of the program reached by the current execution.

29 Claims, 11 Drawing Sheets

OTHER PUBLICATIONS

Bauer et al., "Method of Tracing Asynchronous Multiple Level Interrupts," *IBM Technical Disclosure Bulletin*, vol. 12 No. 21 (May 1979).

East et al., "Relocate and Multiprocessor Map and Trace Monitor," *IBM Technical Disclosure Bulletin*, vol. 15, No.4 (Sept. 1972).

Geer et al., "Instruction Stream Trace," *IBM Technical Disclosure Bulletin*, vol. 26 No. 11 (Apr. 1984).

K. Soule, "Algorithm for tracing Execution Paths to a Given Location in a Program," *IBM Technical Disclosure Bulletin*, vol. 14 No. 4 (Sept. 1971).

Klein et al., "Recording Trace Data in Restrictive Enviroments," *IBM Technical Disclosure Bulletin*, vol. 30 No. 10 (Mar. 1988).

T.A. Hunt, "General Trace Facility," *IBM Technical Disclosure Bulletin*, vol. 15 No. 8 (Jan. 1973).

*FIG. 6*   _phi_test

FIG. 7   _phi_block

COMPUTER SOFTWARE TESTING METHOD AND APPARATUS

FIELD OF THE INVENTION

The invention relates to computer software testing, and more particularly to techniques for measuring internal coverage of software testing.

BACKGROUND AND SUMMARY OF THE INVENTION

The use of software in daily life continues to grow rapidly. For example, we now rely on computer software to handle our financial transactions, control our cars and home appliances, allow us to communicate with one another, inform and entertain us, and perform many other activities. Computer software is also used for some of our most critical complex tasks such as aircraft autopiloting, hospital life support monitoring and control, and controlling nuclear reactors.

Software should ideally be reliable and trouble free. However, even the most carefully designed software typically has defects ("bugs") that cause it to operate improperly or in an unexpected manner under certain conditions. Software "bugs" can cause errors that range from mildly annoying (e.g., an incorrect output format) to catastrophic (e.g., system failure causing serious economic or physical damage).

Just as it is difficult to find latent defects in a complex machine, some software "bugs" can be very difficult to detect and find. The symptoms of a "bug" may not show themselves except in very rare circumstances, and they may be intermittent or based on complex interactions with other software or hardware.

Many software testing techniques to help detect such bugs have been disclosed and published already. See for example the following non-exhaustive list of general software testing references:

Myers, *The Art of Software Testing* (Wiley 1979)

Beizer, *Software Testing Techniques* (2d Ed. Van Nostrand 1990)

Pressman, *Software Engineering: A Practitioner's Approach* (McGraw Hill 1992) (Chapter 18)

Howden, *Functional Program Testing and Analysis* (McGraw Hill 1987)

Perry, *How to Test Software Packages* (Wiley 1986).

Beizer comments in his *Software Testing Techniques* textbook (referenced above) that "bugs lurk in corners and congregate at boundaries" (e.g., parts of the program that execute rarely or define transitions between different operating modes). A programmer will often have a good understanding of how his or her program behaves under everyday processing conditions, but may not have thoroughly thought out or understood how the software will behave under rare, unusual or unexpected conditions. Errors therefore tend to creep into parts of software that implement functions, control or conditions that are out of the mainstream. Additionally, the programmer who writes the software typically may not have a complete understanding of how the software will operate under even normal conditions. For example, a programmer may believe that a certain logical control path defined by the software is not likely to be executed when, in fact, it may be executed on a regular basis. Furthermore, since most software is created by a human being typing characters into a computer, the possibility of typographical errors always exists and the occurrence of such typographical errors is random throughout the software. It is as likely that a typographical error will exist on an obscure logical path defined by the program as on a mainstream path. The resulting "bug" in the mainstream path may be evident on preliminary testing, but bugs in obscure control paths are typically much more difficult to detect.

Software testing is necessary to help locate and eliminate such defects. It is often commercially important to verify that all (or almost all) parts of a program have been executed during testing. One common software testing approach (sometimes called "white box testing") is to devise a set of test cases that will "exercise" specific flow paths in the software. The goal of such testing is to ensure that the internal operation of the software is as expected—and that all (or substantially all) internal paths have been adequately "exercised." This type of testing typically involves attempts to exercise program logic exhaustively by defining all logical paths in the software, developing test cases to exercise each path, and evaluating the results. One might think that such an approach would locate and expose all software defects. However, in the general case it is simply not possible to exhaustively test a computer program. The great length and complexity of most software makes exhaustive testing impossible or impractical. Even a short program can define a huge number of possible paths—so that exhaustive testing might take many months or even years! Typical software development schedules do not provide the time for such exhaustive testing.

Because exhaustive testing is generally impractical, most common software testing methods still rely upon manual procedures in many cases, and testing is often referred to as a creative process—"the art of software testing." Great insight is needed to determine whether the software has been tested "enough"—since acceptable test results can mean either that software reliability and quality are acceptable, or that testing has been inadequate to uncover severe errors.

Prior tools and techniques sometimes called "test verifiers" have been developed to measure how much of a computer program has been tested. This measure can be termed an "internal test coverage value." The "coverage value" is often related to the control structure of the program under test. One example published technique for recording a trace of a program's execution consists of inserting tracing statements into the program at those program constructs which could cause a break in sequential execution. See for example L. D. Harward, Jr. "PL/I Trace Program." *IBM Technical Disclosure Bulletin*, Vol 13, No 4, September 1970. Pp 855–857. However, simply tracing every time locations are reached will produce immense volumes of output that are difficult to understand and interpret. Another example published technique for controlling the volume of output uses an array of flags that can be used to cause output of trace information only upon the first execution of a traced point, or to count the number of times the traced point is reached. See for example, C. P. Geer, F. G. Soltis, J. A. Soyring and T. M. Walker. "Instruction Stream Trace." IBM Technical Disclosure Bulletin. Vol 26, No 11, April 1984, Pp 6217–6220. However, further improvements are possible.

The present invention provides a series of methods and apparatus for mechanical assistance in the process of testing software. The examples and details will be described using the programming languages C and C++, but the techniques are generally applicable to the testing of any software written in many different programming languages (as specified more fully below).

In accordance with one aspect provided by the present invention, an automatic testing technique generates an incremental coverage report from an instrumented executable computer program. In accordance with this aspect, a computer program to be tested is parsed and "instrument" code is inserted at appropriate parts of the program. The instrumented program is then typically executed multiple times with different input conditions in an attempt to "exercise" and test different parts of the program. For each execution, the instrument code inserted by the instrumentation process causes coverage results to be generated and stored. Such coverage results may include information about which parts of the program have been reached by the current execution that had not previously been reached by earlier executions. This "incremental" coverage results output is useful in specifying the value of a current test without flooding the user with volumes of information specifying all parts of the program reached by the current execution. Thus, this aspect provided by the present invention produces coverage output only for portions of the program that are unreached by previous testing—allowing software testing processes to concentrate upon finding tests which increase the test coverage, and reducing the sheer bulk of the coverage output.

In accordance with a further aspect provided by the present invention, the testing process can be accelerated by giving the human test engineer an instantaneous audible or other confirmation of reaching a previously unreached portion of the program.

In accordance with a further aspect provided by the present invention, the instrumenting process described above is optimized by using generated incremental coverage results to control insertion of instrument code from the program under test. For example, once a portion of the program has been reached and fully tested, it is no longer necessary to further test that portion of the program-and the instrument code previously inserted to test that portion of the program may be eliminated. Instrument code "removal" may require reinstrumenting in response to the incremental test coverage results, and then re-compiling prior to further execution. Such techniques speed up program execution— and thus further testing.

In accordance with another aspect provided by the present invention, testing time is estimated by using report information developed during the incremental testing process. In particular, the incremental coverage results may be time stamped, and these time stamps may be used to estimate the ratio of the number of defects revealed by testing to the total amount of time spent testing the software.

In accordance with yet another feature provided by the present invention, comments within the original computer source code may be used to mark certain portions of the program as unworthy of testing. For example, a special comment format may be inserted by the programmer into portions of the source code that need not or should not be tested. The instrumenter process discussed above may simply not insert instrument code into such untestworthy portions—or, in another example, it may insert instrument code and provide a special indication if such code is reached (thereby potentially alerting the programmer that his or her assumption that the code is untestworthy was false).

In accordance with a further aspect provided by the present invention, boundary cases are tested by allowing the instrument code to test for and indicate multiple alternative outcomes of a branch condition beyond "True" and "False".

In accordance with yet another aspect provided by the present invention, coverage results may be used to indicate "exceptional" program portions. For example, an automatic or human process may be used to indicate portions of the program that should not execute under normal circumstances. These portions are then instrumented by the instrumenter process. Upon execution, the instrument code may generate coverage results indicating whether any such "exceptional" portions of the program have been reached. This technique is useful in allowing for the creation of a cumulative results file which is much smaller than that which would be needed if all previously tested program portions were instrumented, and also may allow a programmer to specify a list of program portions which are of particular interest for a specific set of tests designed to determine how well that program handles unusual or exceptional conditions.

In accordance with yet another aspect provided by the present invention, program instrumentation can be used for diagnostic purposes after the program is released to users. It has been said that testing never ends, it just gets transferred from the developer to the customer (so that every time the customer uses the program, a test is being conducted). In accordance with this aspect provided by the present invention, a program can be distributed in a diagnostic instrumented version. The instrumentation in this instance may correspond, for example, to the exceptional portions described above. When the diagnostic version of the program executes, the instrument code may provide error condition indications of exceptional control paths being taken by the program. These indications may provide important information or clues as to why the program is behaving abnormally or unexpectedly.

BRIEF DESCRIPTION OF THE DRAWINGS

These and other features and advantages provided by the present invention may be better and more completely understood by referring to the following detailed description of a presently preferred example embodiment in conjunction with the drawings, of which.

DETAILED DESCRIPTION OF EXAMPLE EMBODIMENTS

Figure 1:
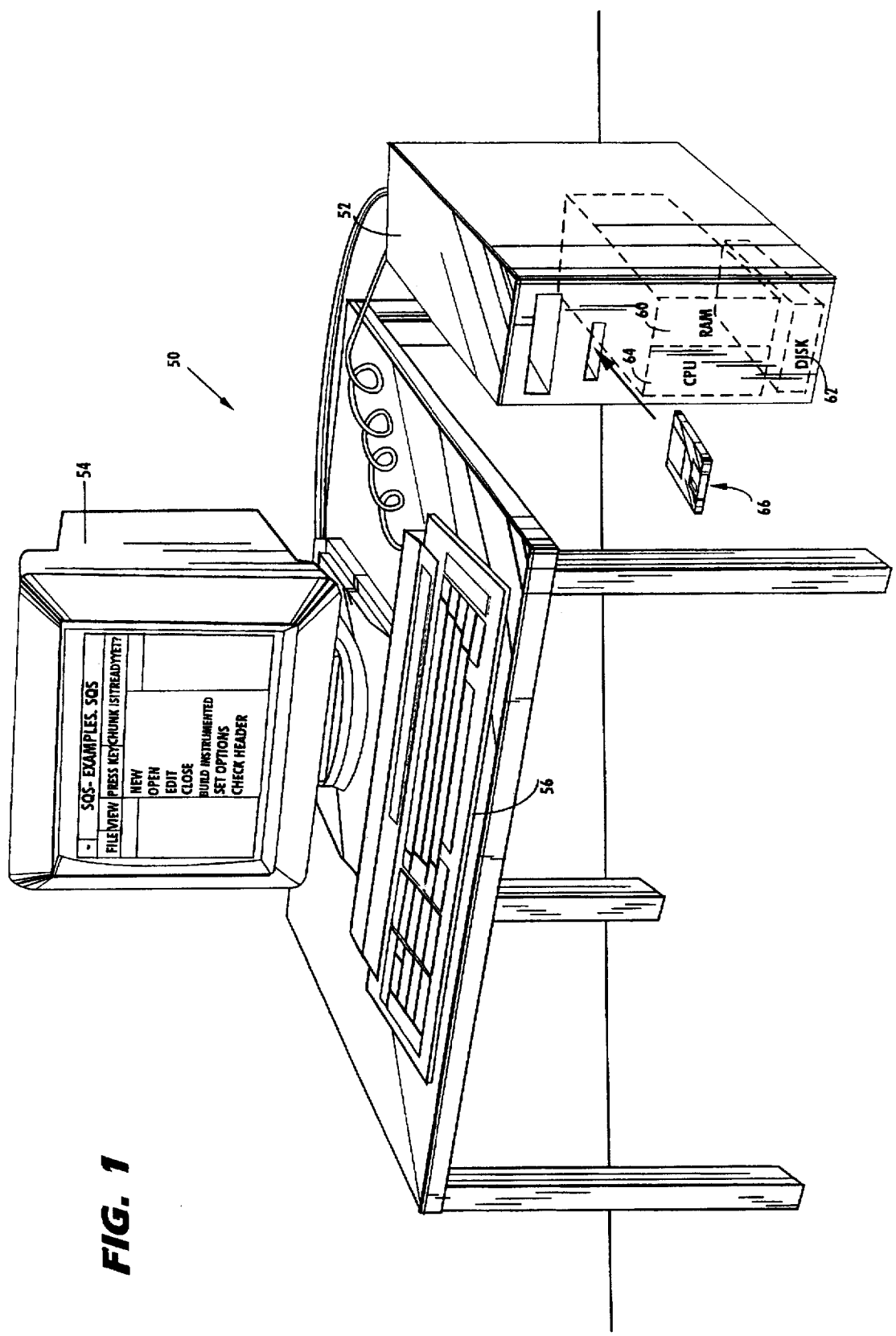
FIG. 1 shows an example computer system.

FIG. 1 shows an example computer system 50 that can be used to perform the software testing techniques provided by the present invention. Example system 50 may include a conventional personal computer 52 connected to a display 54 and a keyboard 56. Information produced by the personal computer 52 may be displayed on display 54, and the user may interact with and control the personal computer by typing characters on keyboard 56. A mouse, trackball or other conventional pointing device (not shown) may allow the user to provide additional interactive inputs to personal computer 52.

In this example, personal computer 52 includes an internal processor 58, memory (e.g., random access memory, or RAM) 60 and internal hard disk 62. Personal computer 52 may also include a diskette drive 64 that allows it to read from and write to a portable diskette 66 or other storage medium.

In accordance with the present invention, personal computer 52 is programmed to run a special testing application tool that provides software testing. This application (i.e., a software program) may, for example, be loaded into the personal computer 52 via diskette 66 (or other convenient, conventional means) and may be stored on the personal computer internal disk 62. The user of personal computer 52 may control the personal computer (e.g., via keystrokes, cursor movement, etc.) to execute the software testing application. Such execution causes the personal computer 52 to produce displays on display 54 (the one shown is one example display that may be produced by the software testing application).

Figure 1A:
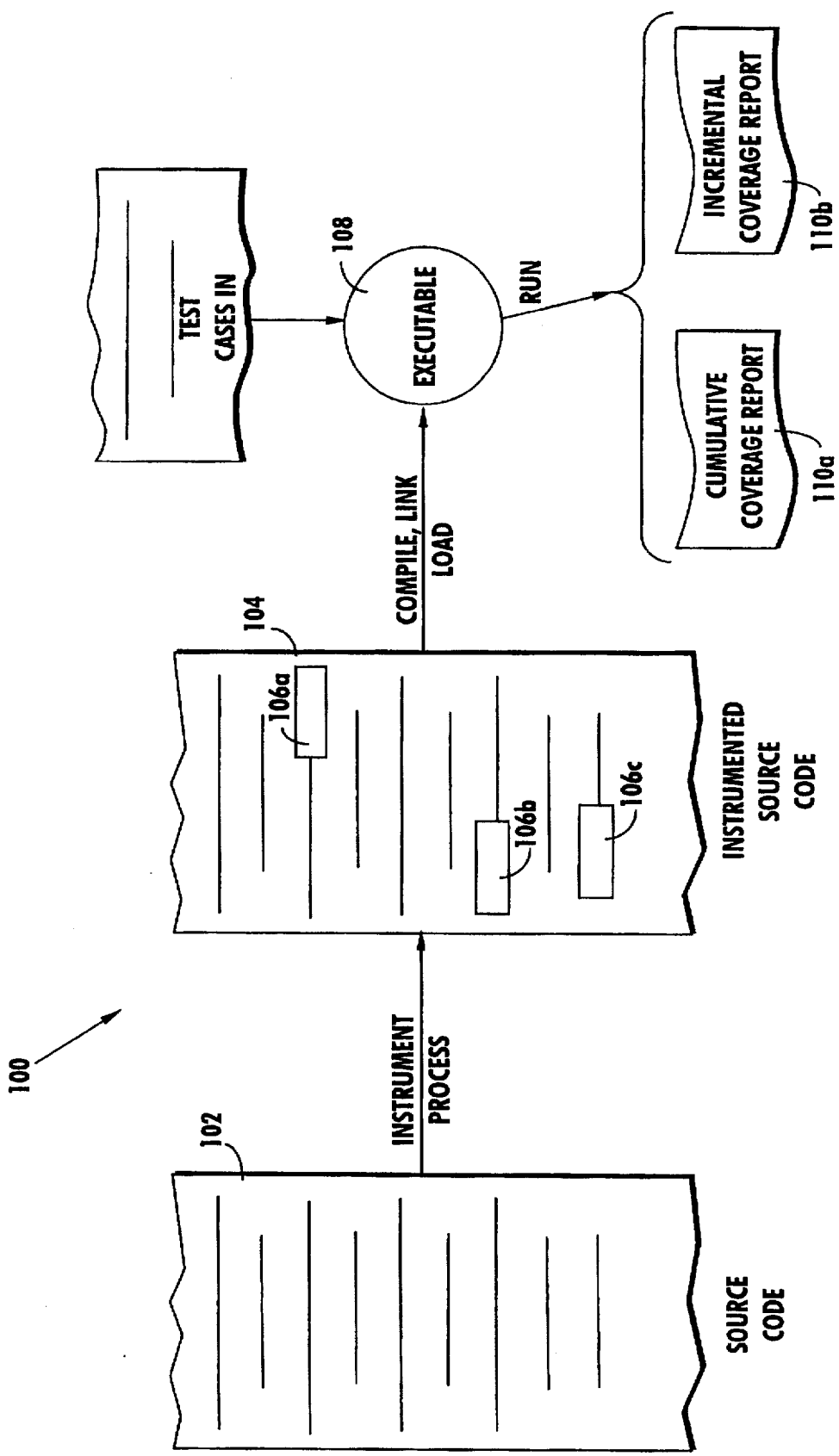
FIG. 1A shows an example process provided in accordance with this invention.

FIG. 1A shows an example overall software testing process 100 provided in accordance with this invention. The starting point of process 100 is a source code version of a computer program 102 to be tested. This source code may be written in any computer language, although the examples described herein assume that the source code is written in a computer programming language called "C." Source code computer program 102 is typically created by a person skilled in computer programming. It may be created on system 50 shown in FIG. 1 using appropriate conventional software tools (e.g., an editor), or it may be created on a different computer system and inputted to the FIG. 1 system 52 via diskette 66 or other communications means.

In accordance with this invention, system 50 processes source code computer program 102 by "instrumenting" it to result in an instrumented source code 104. The instrumenting process 200 (see FIG. 2) inserts instrument code 106 at appropriate insertion points within the original source code 102.

This added, instrumented code 106 is inserted into specific insertion points within the source code 102 selected by the instrumentation process 200 to "expose" and test different logical subdivisions or "chunks" of the source code. This instrument code, when executed as part of the overall program, provides useful information concerning software testing and coverage results. A computer typically does not execute source code 102 linearly as one might read a book from beginning to end. Instead, source code 102 typically includes "branches" that cause the computer to skip over parts of the source code without executing them. The instrumentation process 200 in one example inserts instrument code 106 into each block or "chunk" of the program that may be skipped over (i.e., selectively executed or not executed based upon evaluation of a branch expression). Instrument code thus can indicate which parts of the computer program 102 under test have been executed and which parts have not been. Such "coverage" results are very useful in determining how adequately the program has been tested and which parts have been tested.

Typically, a further, conventional process using conventional tools is used to compile, link and load (see FIG. 2 block 202) instrumented source code 104—thus transforming the instrumented source code into a "machine language" or "object code" executable 108. This executable 108 can be executed by computer system processor 58 to test program 102.

The user may define inputs in the form of test cases to be provided to this executable 108, for example, in the form of an input file or files containing input data to be processed by the executable. The type of inputs will generally depend on the type of computer program 102. For example, a computer program 102 designed to perform financial calculations may accept numerical database entries as inputs, whereas, a computer program 102 designed to operate a real-time manufacturing process may accept sensor inputs. A skilled software tester specifies a set of test cases designed to exercise most or substantially all of the computer program 102 and to test "boundary" conditions—thereby assuring that testing has been adequate to discover latent "bugs" and to verify that the program is operating properly and according to specifications.

Computer program 102 may generate its own outputs in the form of a display on display 54, one or more computer files on disk 62, etc. In addition, however, in accordance with one aspect of the present invention, execution of executable 108 (see block 204, FIG. 2) permits instrument code 106 to generate coverage test results 110. In this example, instrument code 106 produces two different coverage test results: a cumulative coverage report 110a specifying all paths or "chunks" of computer program 102 that have been exercised by the current and all previous executions; and an incremental coverage report 110b that indicates which paths or chunks of computer program 102 (if any) have been exercised by the current execution that were not exercised by previous executions. Executable 108 may be run many times with different test cases inputted to it, and for each execution instrument code 106 adds to the cumulative coverage report 110a and creates a new incremental coverage report 110b.

The incremental coverage report 110b is extremely useful in giving a software tester immediate feedback about the value of the test cases inputted during the current program execution and about the behavior of the program 102 in response to such test cases. For example, if the software tester is familiar with the internal structure of program 102 under test, he or she may devise a new test case to exercise a previously unreached part of the program. The incremental coverage report 110b will verify whether or not that part of the program has been exercised by the new test case. In combination with the cumulative coverage report 110a, the incremental coverage report 110b gives the software tester good information about how much of the program 102 has been tested and how much remains to be tested. In addition, these two reports can be used to determine specifically which paths within computer program 102 have not yet been exercised—thereby assisting the software tester in coming up with additional test cases (or allowing the software tester to decide that the program has been adequately tested such that no further testing is necessary).

Figure 2:
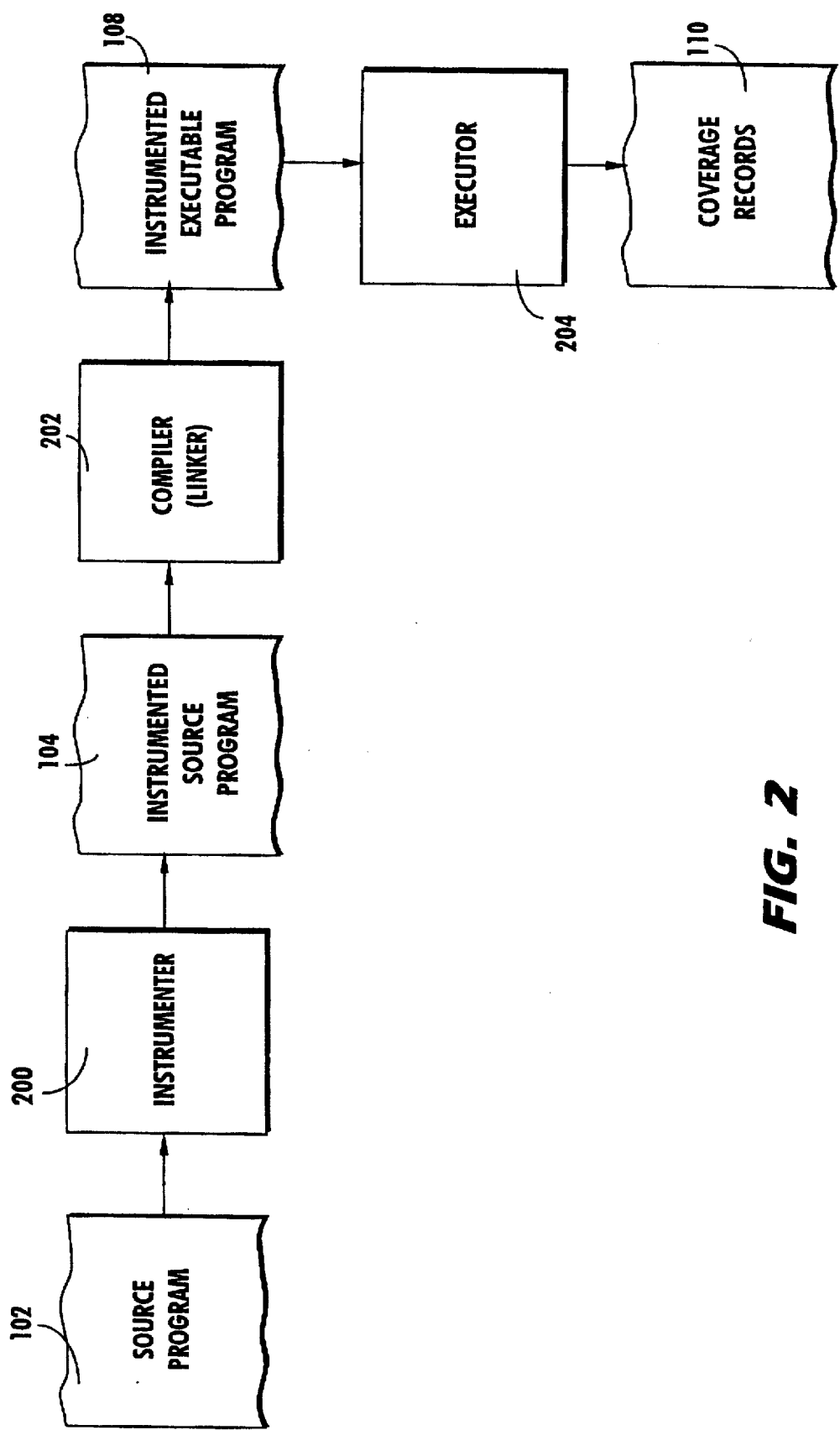
FIG. 2 shows overall operations provided in accordance with this invention.

FIG. 2 shows the particular software structures processed by computer system 50 in somewhat greater detail. FIG. 2 shows that the software testing application provided in accordance with one example of this invention includes an instrumenter 200, a compiler/linker 202 and an executer 204. Note that the compiler/linker 202 may be supplied by conventional compiler software, and the executer 204 may be supplied by a conventional operating system. Instrumenter 200 is supplied by the special testing application tool loaded onto computer system 50.

Figure 3:
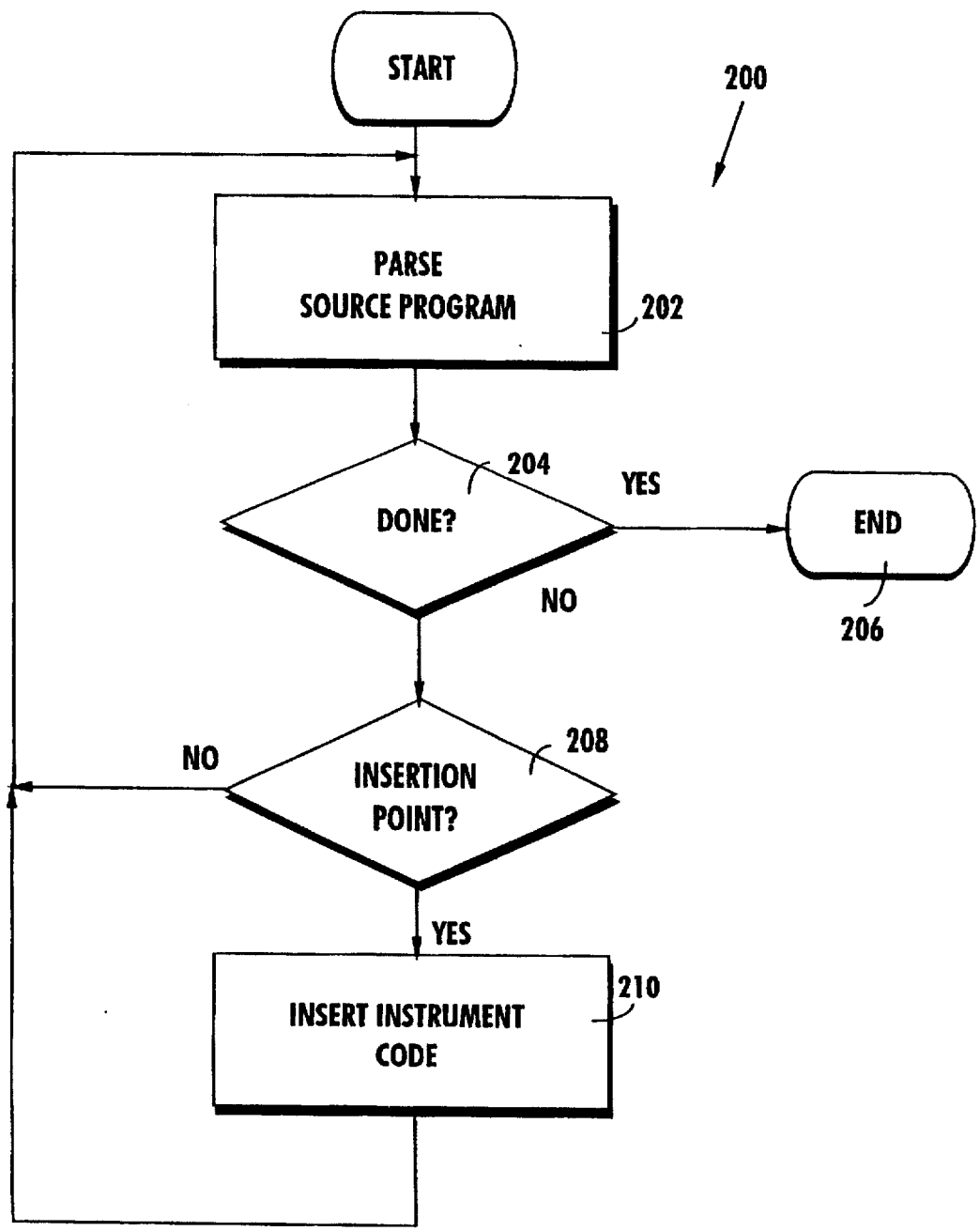
FIG. 3 shows example detail concerning the instrumenter block of FIG. 2.

FIG. 3 shows a high level flowchart of the steps performed by instrumenter 200 in this example. The instrumenter 200 typically begins at the beginning of the source code computer program 102 under test, and begins parsing the source program (block 202). The term "parser" refers to a well-known set of techniques used in the analysis of programming languages which is used to determine the syntactic validity and semantics of a program or portion of a program specified in a particular programming language. Details on the construction of a parser can be found in a standard text on compiler construction, such as "Compilers: Principles, Techniques, and Tools" by Aho, Sethi, and Ullman (Addison Wesley, 1986). The instrumenter 200 is done when it has finished parsing the entire program 102 under test (decision block 204, "end" bubble 206).

The parser block 202 in this example determines insertion points for inserting instrument code 106. When an insertion point is found ("yes" exit to decision block 208), the instrumenter 200 inserts instrument code 106 at that position in the computer program (block 210). Otherwise, instrumenter 200 continues parsing until it reaches the end of the program ("yes" exit to decision block 204).

Figure 4A:
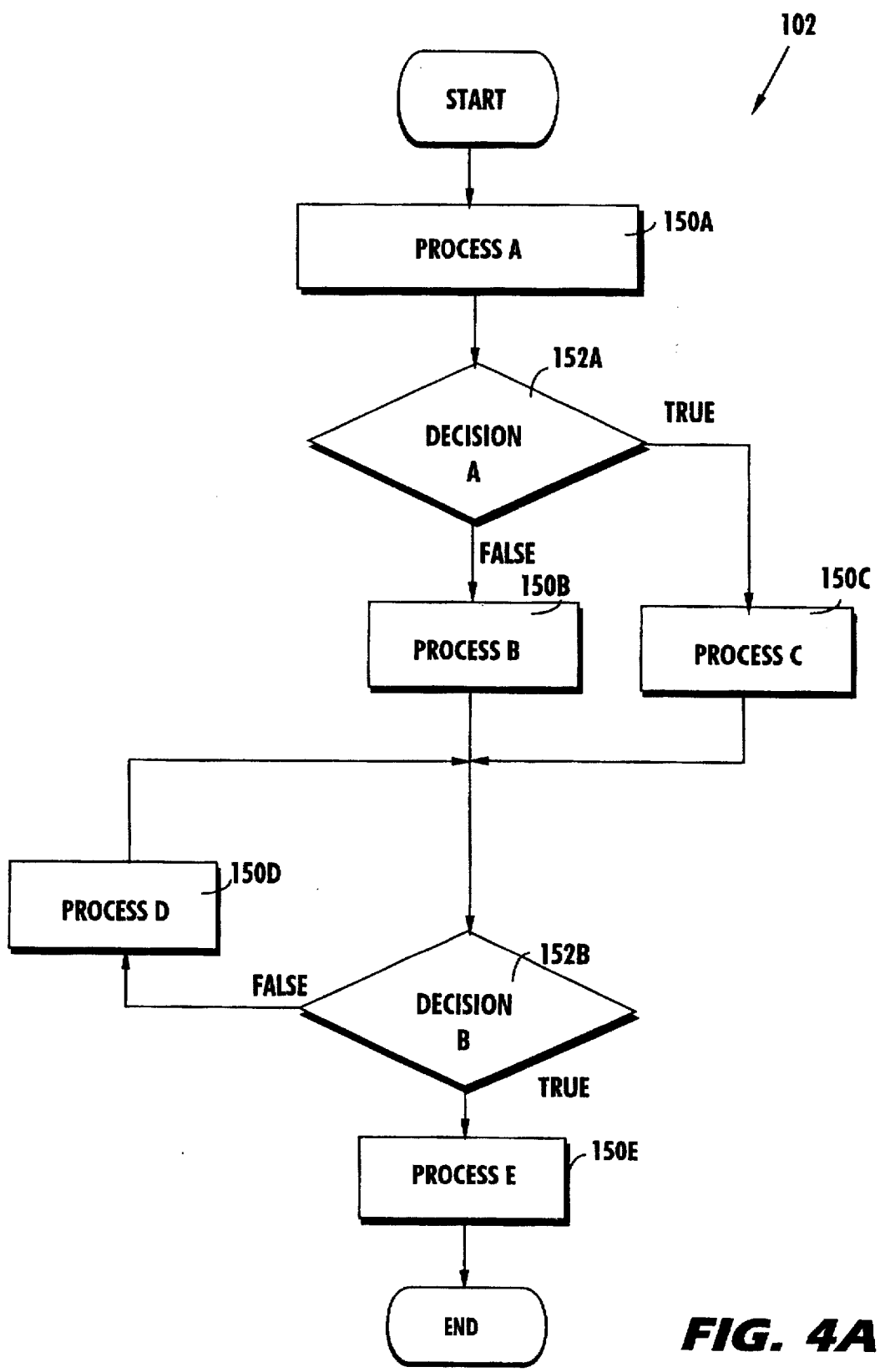
FIGS. 4A and 4B show examples of original and instrumented flowchart depictions of the same source program in one example.
Figure 4B:
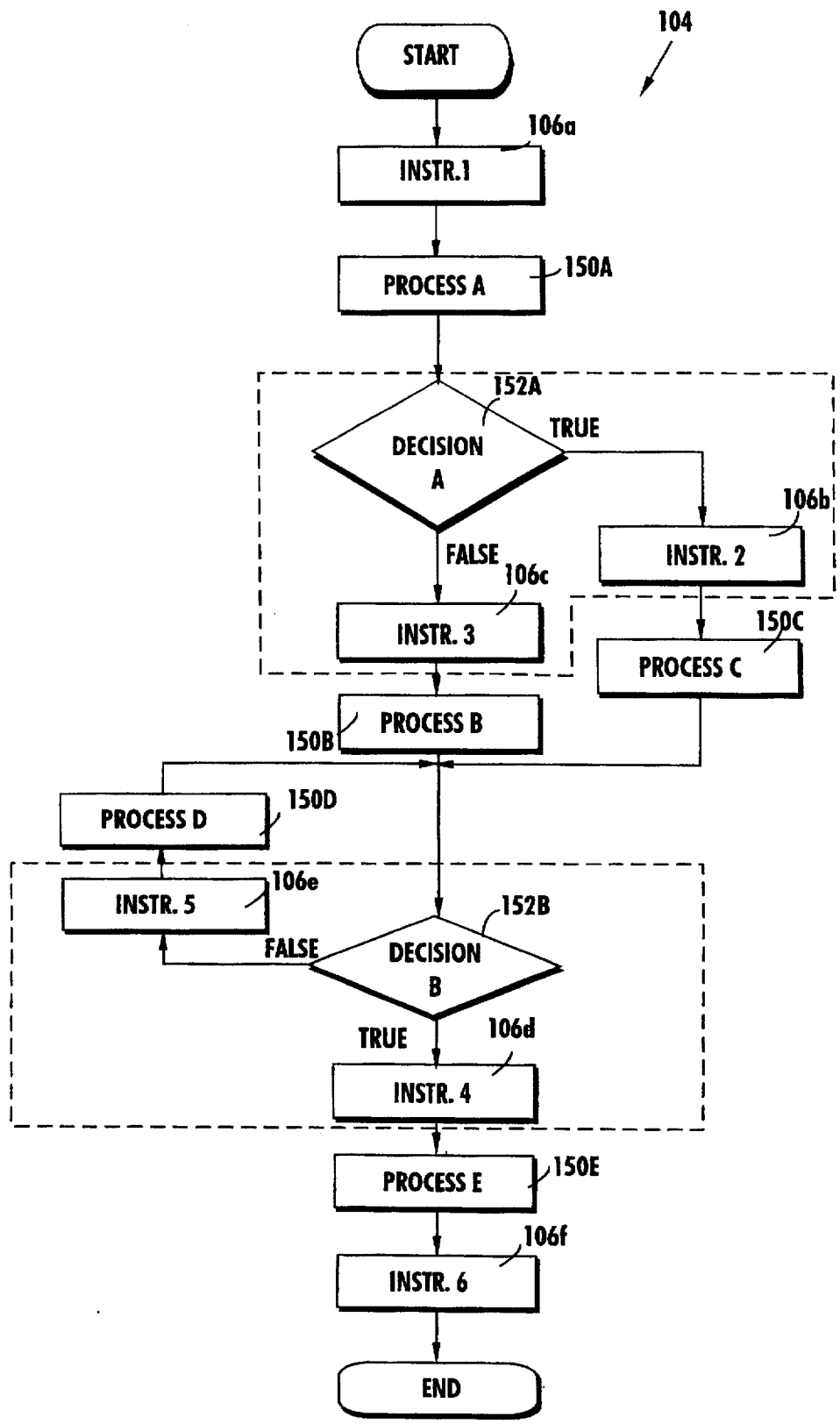

FIGS. 4A shows an example of a computer program 102 to be tested and as FIG. 4B shows an instrumented version 104 of that computer program produced by instrumenter 200 in this example. In this example, the computer program 102 under test includes process blocks 150 and branches 152. As shown in FIG. 4B, the instrumenter 200 inserts instrument code 106a before each process block (e.g., the first process 150a in the computer program 102 under test). It also inserts instrument code at the beginning of each path defined by each branch (e.g., it inserts instrument code 106b, 106c before each different path defined by branch 152a, and similarly inserts instrument code 106d, 106e at the beginning of each branch path defined by branch 152b). Instrumenter 200 also inserts instrument 106f just before the end of the computer program 102.

In general, the initial instrument code 106a is used to set up data structures for performing the coverage reporting process. Instrument code 106b, 106c, 106d, 106e inserted within the various branch paths are used to actually generate internal indications of which paths of the computer program 102 have been exercised and which ones have not been exercised. The final instrument code 106f in this example generates coverage reports 110a, 110b by writing the coverage reports to a file and/or displaying them on display 54.

Figure 5:
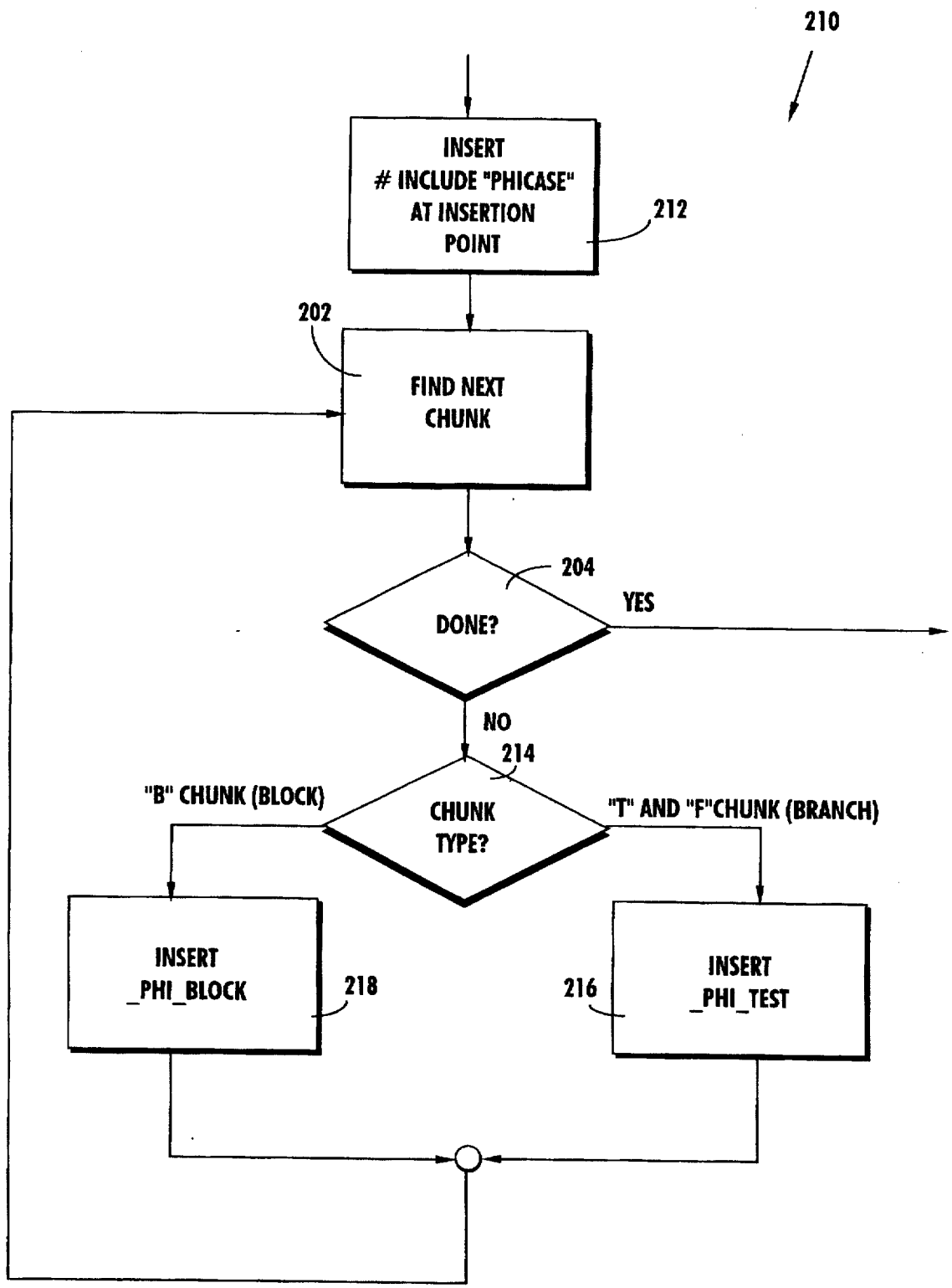
FIG. 5 shows more detailed description of the instrumenter block of FIG. 2.

FIG. 5 shows a more detailed explanation of the "insert instrument code" block 210 of FIG. 3. Referring to FIG. 5, once an insertion point has been located, the instrumenter 200 inserts in this example a particular "case" instrument code at the insertion point (assuming it is the first insertion point in the program) (block 212). As explained in more detail below, such insertion may comprise, for example, a certain inclusion of symbol definitions at the "inclusion" insertion point. The parser process 202 is then used to find the next "chunk" of the program 102 and the overall process 204 completes when done (decision block 204). Once a chunk is located, the block 210 determines whether the chunk type is a "block" chunk or a "branch" chunk. Branch chunks are analogous to the branches 152 shown in FIGS. 4A and 4B, and result in "test" type instrument code being inserted into the beginning of each branch path they define (decision block 214, block 216). A "block" type chunk is analogous to the process block 150e shown in FIGS. 4A, 4B, and result in "block" instrument code 106 being inserted (block 218).

Figure 6:
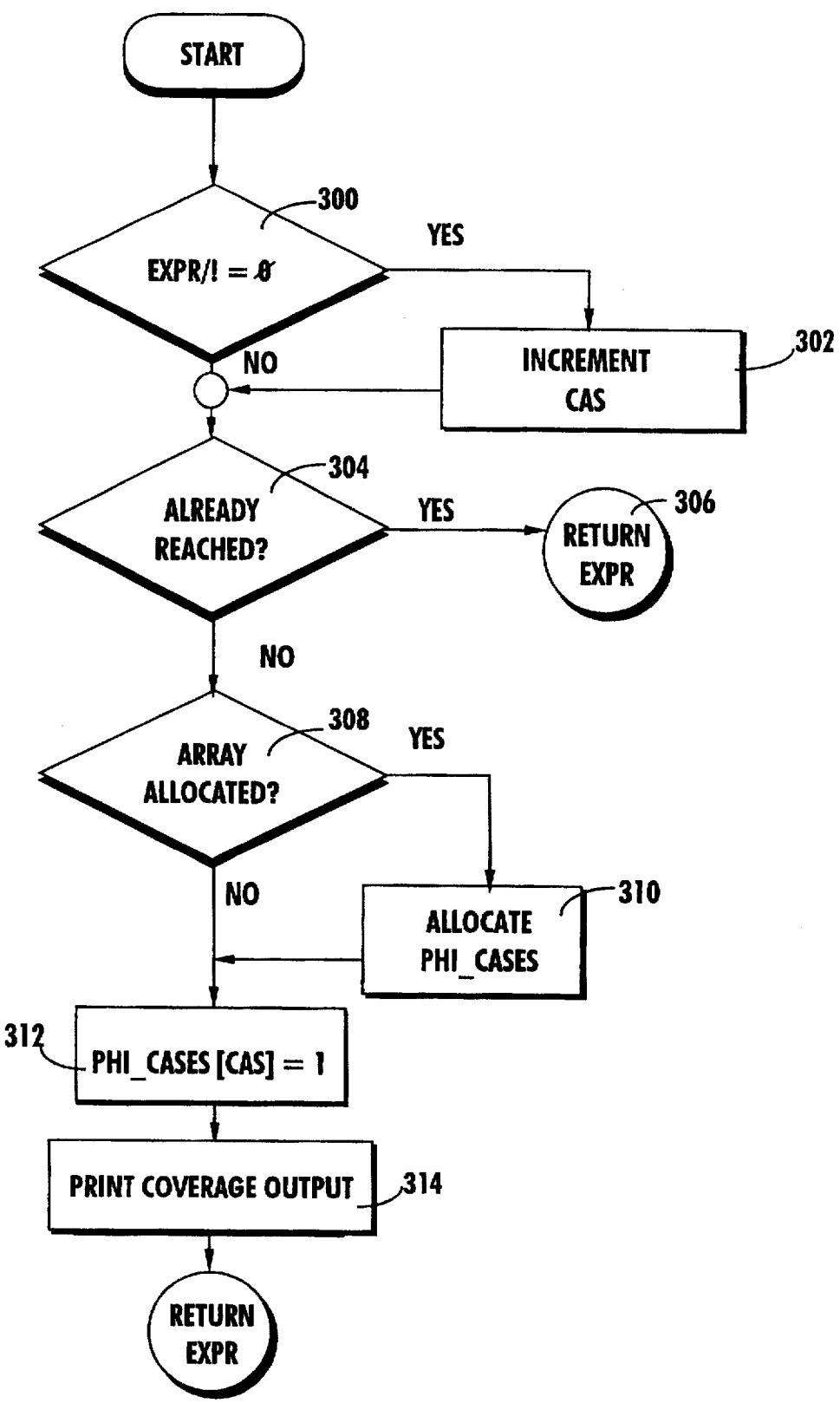
FIG. 6 shows an example "test" instrument code program control sequence.
Figure 8:
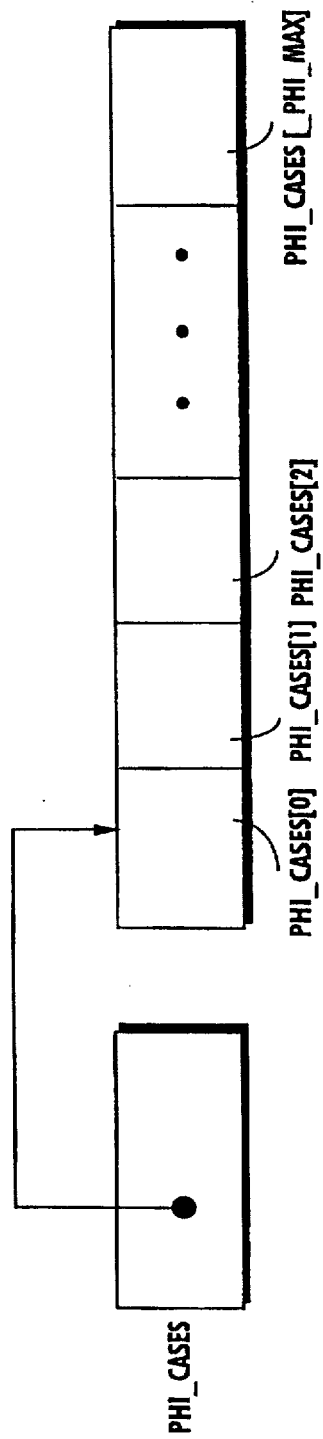
FIG. 8 shows an example coverage array.

FIG. 6 shows example program control steps performed by the "test" instrument code in the "function" procedure that is invoked by the code inserted by block 216. In this example, the "test" instrument code evaluates the expression used by the branch under test for branching. The "chunk numbers" for a pair of "false" and "true" ("T" and "F") chunks are always a pair of numbers; the chunk number for the "true" chunk is equal to the chunk number of the "false" chunk plus one. Therefore, if the expression is "true" (i.e., not equal to 0), the "chunk number" is incremented (decision block 300, block 302). The instrument code next determines whether this particular path has been reached by any previous execution (decision block 304). It performs this test by referring to a "cases" array (example shown in FIG. 8) that maintains a flag indicating reached/unreached status for each path in the program 102 that contains instrument code. If the path has previously been reached, the instrument code returns an expression indicating this (block 306). Otherwise, the instrument code determines whether a flag exists in the "cases" array corresponding to this path (decision block 308). If no flag exists, the instrument will allocate a new array entry corresponding to the path (block 310). The instrument will then set a flag within the "cases" array to indicate that this path has been reached (block 312), and will add (in one example) a corresponding entry to each of coverage reports 110a, 110b (block 314).

MORE DETAILED DESCRIPTION OF EXAMPLES

The following is a detailed "C" source code example of a "test" function:

```
/* static functions for coverage implementation */
static int __phi__test (int cas, int line, int expr)
{
    char truth;
    if (0!=expr)
        ++cas;
    if (__phi__cases && __phi__cases[cas] != 0)
        return expr;
    truth = (0!=expr) ? 'T' : 'F';
    if (!__phi__cases)
    {
        __phi__cases = __phi__alloc (cas, line, truth,
            __phi__fname, __PHI_MAX);
    }
    else
    {
        __phi__cases[cas] = 1;
        __phi__reached(cas, line, truth, __phi__fname, 0);
    }
    return expr;
```

Figure 7:
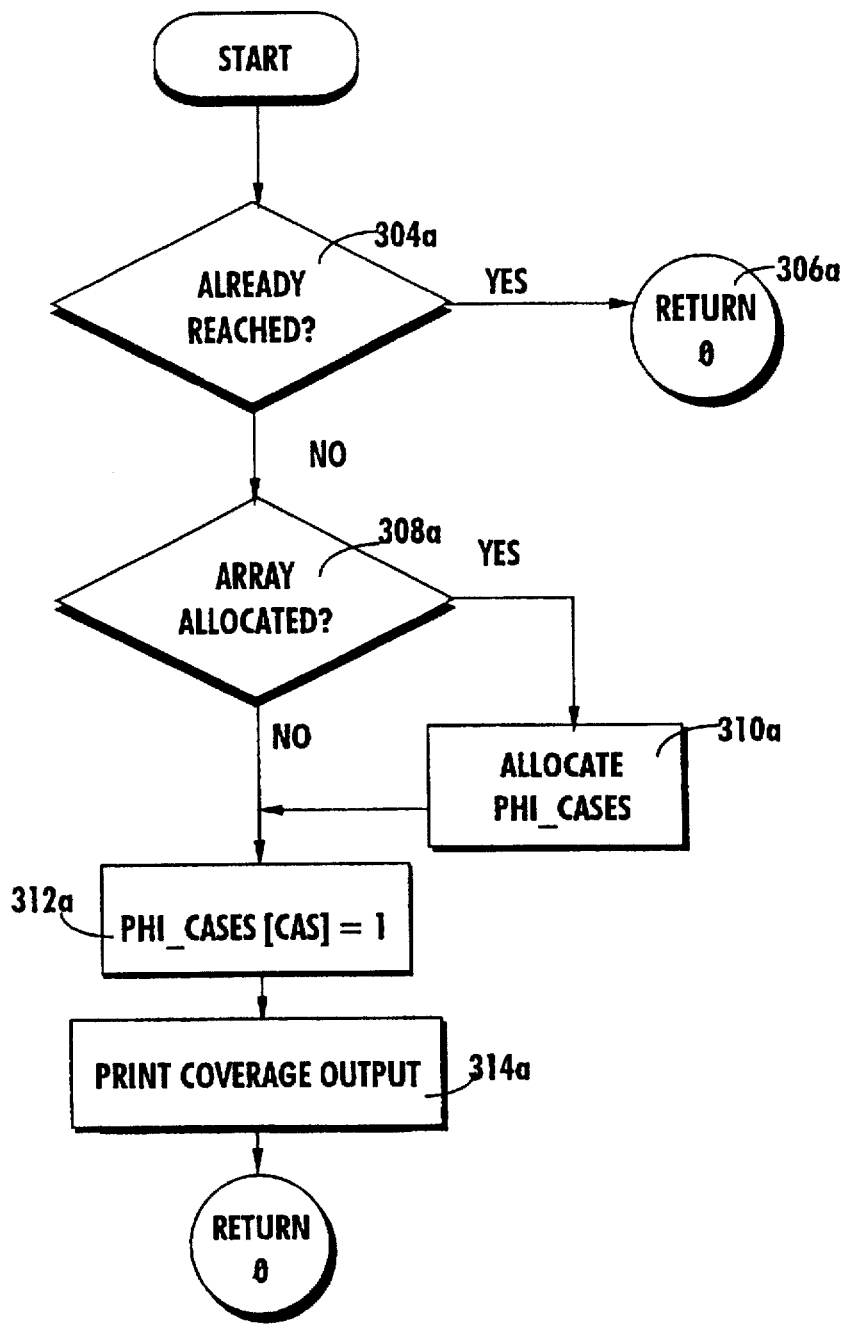
FIG. 7 shows an example "block" instrument program control sequence.

FIG. 7 shows a program control logic performed by an example "block" test instrument code inserted by FIG. 5 block 218. This code is very similar to the FIG. 6 example except that there is no need to evaluate any branch expression or to return any associated value. The following is a detailed "C" example of a "block" function:

```
static int __phi__block (int cas, int line)
}
    if (__phi__cases && __phi__cases[cas] != 0)
        return 0;
    if (!__phi__cases)
    }
        __phi__cases = __phi__alloc (cas, line, 'B',
            __phi__fname, __PHI_MAX);
    }
    else
    {
```

```
    _phi_cases[cas] = 1;
    _phi_reached(cas, line, 'B', _phi_fname, 0);
    }
  return 0;
}
```

Incremental Coverage Report From Instrumented Executable

As discussed above, it is often commercially important to verify that all (or almost all) parts of a program have been executed during testing. In order to assist with this purpose, the machine embodied in this example reads on its input (e.g., a diskette) a source program (e.g. "example1.c") written in a programming language (e.g., C, C++, Java, Visual Basic, etc.). This machine writes onto its output (e.g., again a diskette) a modified version of the source program "example1.c", a version which will perform the same computation as "example1.c" but which will in addition create a record of the parts of the "example1.c" program which have been executed during testing. This new version of the program is known as the "instrumented version". The instrumented version duplicates the logic of the original program but also includes additional code to record when each portion of the program has been executed.

| input source -> program | (Instrumenter 200) -> | instrumented output program |
|---|---|---|

"Chunk" may refer to each portion of the program which can be reached by either a function call or some form of conditional test. Instrumenter 200 in this example can process source files written in either of the C or C++ programming languages. It invokes a parser module to perform an analysis of the source code to determine the chunks which make up each source file in the program being instrumented. Two kinds of chunks are identified by this process:

1. A block chunk (or 'B' chunk) marks the first executable expression in a block.
2. A matching pair of conditional-chunks marks two portions of the program which are executed only if a specific condition is true or false. A matching pair of conditional-chunks consists of a 'T' chunk, which is executed if the condition is true, and an 'F' chunk, which is executed if the condition is false.

Identification of Chunks Using a Recursive Descent Parser

A recursive descent parser for the programming language being used to write programs which are to be instrumented using instrumenter 200 can be easily modified to determine the chunks and their positions in the source file being parsed. Such a parser performs its lexical analysis of a source file by interpreting it as a stream of tokens, which are sequences of characters such as identifiers, numbers, text strings, keywords, and punctuation. The actions of a recursive descent parser are determined by the set of tokens which it obtains from reading the source file. When certain tokens are encountered in a particular context, the position of those tokens in the source file can be used to determine the location at which code must be inserted into the instrumented program. There are three different cases that must be recognized:

1. The position of the block chunk at the beginning of a function or procedure is that of the first token following the token which, according to the grammar for the programming language, marks the beginning of the body of that function or procedure. In the case of C and C++, this is the first token after the opening brace of a function definition.
2. The position of the block chunk at the beginning of a separately reachable portion of a switch statement is that of the first token following a case or default label which is not itself another case or default label. (Each separately reachable portion of a switch statement may be preceded by more than one case label.)
3. The positions of the conditional chunks for a control flow statement with a controlling conditional expression are that of the first token preceding the beginning of the conditional expression (this is the position of the 'F' chunk), and of the first token following the end of the conditional expression (this is the position of the 'C' chunk).

A recursive descent parser constructed for a programming language will incorporate routines to recognize each of these language constructs (the beginning of a function or procedure, case and default labels within a switch statement, and conditional expressions in control flow statements). Modifying such a parser to recognize the chunk positions described above is straightforward, requiring that the parser retain information relating each source file token to its line number and character position in the source file.

Instrumenting Inline Functions in Common Header Files

In the C++ programming language, programmers can write functions which are declared "inline". Such functions are designed to be expanded wherever they are used, instead of being defined in one location in the program and reached via a branch-to-subroutine instruction. In order for such inline functions to be used by more than one source module in a program, the definitions of these functions are placed in common header files which are then processed as if they were part of each module when it is compiled. In order for the techniques of instrumenter 200 to be used to instrument the bodies of these inline functions, two additional files must be created for each header file containing inline functions to be instrumented:

1. A source file which uses the header file must be created with a unique file name that does not collide with the name of any other source file in the program. This file is required because instrumenter 200 requires every chunk in the program to be uniquely identified by the combination of a source file name and a chunk number within that source file. This new source file satisfies that requirement, and is also used to define the bodies of the inline functions, which must be removed from the header file so that the instrumentation added to them can refer to the file name declared within the new source file.
2. A new version of the header file must be created which has been modified so that any inline functions in it are declared as external rather than inline.

Instantiation of Template Functions

In the C++ programming language, generic functions can be defined using the construct known as templates. Such functions cannot be correctly parsed until specific instances of them are defined with suitable values for the template parameters. Since the techniques of instrumenter 200 in this example require that a function to be instrumented be parsed, some additional work is required to instantiate template functions when the source file is being parsed for chunk positions. This additional work can be performed manually by adding code to such a source file that defines an instance of each template function which is to be instrumented. Alternatively, a more sophisticated parser can be used which records information about all of the references to template functions in a program, and then uses that information to determine the template parameters needed for instantiation of all of the template functions which are actually used.

For each chunk, instrumenter 200 records the locations in the source file where instrumentation code needs to be inserted. These insertions are performed so as to preserve the line numbers of the original source file. The process of adding the insertions is called instrumentation, and the resulting source file is called an instrumented source file. Instrumentation proceeds according to the following sequence:

1. Define the "Insertion Point" as the front of the first line in the source file which is an empty line (or consists only of a comment) after the last #include before the position of the first chunk in the source file. At the insertion point, a #include statement is inserted—e.g.
include "phicases.h"
which includes a header file (e.g. "phicases.h") that declares the functions called by the instrumented source file. These functions record when each chunk has been reached.

The specific names for header files, function names, and other program symbols are illustrative examples but other names could be used instead.

2. For each chunk, the following code is inserted:

a) Block-Chunk ('B' chunk): a declaration of a uniquely-named int variable which is initialized by a call to the __phi__block function. For example, if chunk number 1 is an 'B' chunk, the inserted code would look like this:
int__uniquename__1=__phi__block(1, __LINE__);
(Note that __LINE__ is a predefined word of C and C++ which translates into the line number of the source file.)

(b) Within a switch statement there may be several sequences of executable statements between the case labels. Although technically-speaking only the first of these is the beginning of a syntactic block, for purposes of coverage analysis we treat each of them as a 'B' chunk and generate a call to the __phi__block function. For example, if the uninstrumented source program contains

```
switch (n)
{
case 1:
``` and the next chunk-number is chunk 2, then the instrumented source would look like this:

```
switch (n)
{
case 1:
    __phi__block(2, __LINE__);
``` c) Conditional Chunk: a call to the __phi__test function with the value of the conditional expression. For example, if the uninstrumented program contains this test— while (n==1)
and if the next chunk-number is chunk 3, then the instrumented source would look like this:
while (__phi__test(3, __LINE__, 0!=(n==1)))

In order to identify a specific location in the program with each of the chunks, the 'F' chunk is ascribed to the position just to the left of the condition being tested, and the 'T' chunk is ascribed to the position just to its right:

```
while (n = 1)
       ^   ^
       3   4
```

The machine which inserts the instrumentation into the subject program adds
__phi__test(chunk-number, __LINE__, 0!=(
at the position marked by the 'F' chunk, and adds
))
at the position marked by the 'T' chunk.

3. At the end of the source file, a declaration of a static variable containing a pointer to the name of the source file is inserted, along with a #define of the number of chunks in the source file, and a #include of a file defining static (local) versions of the __phi__block and __phi__test functions. For example, the end of our "example1.c" program as described above could look like this:

static char *__phi__fname=__FILE__;
define __PHI__MAX (4+1)
include "phicases.c"

(Note that __FILE__ is a predefined word in the C and C++ languages that designates the name of the source file.)

Chunks are assigned numbers in the order in which they are encountered in the source file. Each conditional chunk is assigned two consecutive chunk numbers, the first for the case where the condition is false and the second for the case where the condition is true. Within an instrumented program, each chunk is uniquely identified by two components: the name of the source file and the number of the chunk within that file. The line number of the beginning of each chunk is also passed to the __phi__block and __phi__test functions. To complete the construction of an instrumented program, extra source lines must be added to the instrumented source files, to define the functions which perform the logging of the information about what chunks have been reached during execution of the program. In the preferred implementation, these extra source lines are appended to the first source file in the list maintained in the "project" information.

Inline Template and Member Functions

A further refinement may be used for inline template functions and member functions defined inline in template classes in C++. In order for instrumented functions to be compiled by the widest range of C++ compilers, the preferred embodiment generates out-of-line instrumented functions in the same header file that contains the original definition. This is accomplished as follows:

(1) The files in each project are numbered, from 1 to N.
(2) The instrumentation added to such out-of-line functions (for example in the N-th function in the project) will invoke an external-linkage function named __phi__test__N instead of __phi__test, or an external-linkage function named __phi__block__N instead of __phi__block.

(3) In the source file associated with the N-th header file, the external-linkage function __phi__test__N will simply invoke the internal-linkage function phi__test and the external-linkage function __phi__block__N will simply invoke the internal-linkage function __phi__block.

The resulting effect of this refinement is that, regardless of the specific method used to instantiate the template functions, the resulting out-of-line instantiations will invoke the "test" and "block" functions that are associated with the one specific source file which contains the instrumentation for the out-of-lines generated by the original header file.

The methods described above are summarized in the flow chart of FIGS. 2, 3 and 5 as described above.

Incremental Coverage Results

The information about what chunks have been reached during execution is called coverage results ("coverage" because it indicates to what extent the chunks of the original source code have been "covered" by testing). Each instrumented program created by instrumenter 200 is capable of producing incremental coverage results, which consists of information about what new chunks have been reached in the current execution over and above those that were reached by previous executions of the same program. Coverage results are recorded in two different files:

1. The current results file (e.g. "example1.phi") records the chunks which have been reached by the most recent execution of the instrumented program.

2. The cumulative results file (e.g. "example1.pho") records the chunks which have been reached by all previous executions of the instrumented program.

Each line in a coverage results file is either (1) an information line which indicates when the instrumented program was executed (or other information as described below), or (2) a coverage line which indicates the source file name, source line number, and chunk number for a chunk that was reached during execution. When a chunk is reached in a source file for which no other chunks have yet been reached, the coverage line also includes the total number of chunks in the source file.

When an instrumented program begins execution, the first instrumented chunk to be reached causes additional special processing, performed only once during execution of the instrumented program:

1. If a current results file exists, its contents are appended to the cumulative results file.

2. The resulting cumulative results file is read, and each coverage line is used to initialize the "chunk-reached" array for the corresponding instrumented source file.

3. An information line is written to the cumulative results file with the current date and time, current user name, and current directory.

4. An empty current results file is created.

During execution of an instrumented program, a call to either the __phi__block or the __phi__test function is executed for each chunk which was instrumented. For each source file which has been instrumented, an array of flags is allocated; this array is indexed by chunk number and records whether each chunk in that source file has been reached. A list is maintained of the names of the source files for which such arrays have been allocated. When a chunk is reached for the first time, the flags array is allocated if needed, and a coverage line is written to the current results file. Then the corresponding flag in the array for that source file is set to indicate that the chunk has been reached. Once a chunk has been marked as reached, a call to either the __phi__block or the __phi__test function has no further effect.

The cumulative results file thus contains a record of each execution of the instrumented program, along with coverage lines for each chunk reached. From this information, the number of new chunks reached by each particular execution of the program can be determined.

For example, assume that the following program ("example2.c") is the input source program. The interspersed numbers indicate the locations of the chunks.

```
1     #include <stdio.h>
2
3     int main()
4     {
            ∧
            1
5         int number;
6         printf("example2:\n");
7         while (scanf("%d", &number) == 1)
            ∧                            ∧
            2                            3
8         {
9             int number__was__odd = (number % 2);
10            switch (number__was__odd)
11            {
12            case 1:
                ∧
                4
13                printf("number was odd\n");
14                break;
15            default:
                ∧
                5
16                printf("number was even\n");
17            }
18        }
19        return 0;
20    }
```

Example in the instrumenter 200 will produce the following output file, the instrumented source program:

```
1     #include <stdio.h>
2     #include "phicases.h"
3     int main()
4     { int __unique__name__1 =
          __phi__block(1, __LINE__);
5         int number;
6         printf("example2:\n");
7         while (__phi__test(2, __LINE__,
              0!=(scanf("%d", &number) == 1)))
8         {
9             int number__was__odd = (number % 2);
10            switch (number__was__odd)
11            {
12            case 1:
13                __phi__block(4, __LINE__); printf("number was odd\n");
14                break;
15            default:
16                __phi__block(5, __LINE__); printf("number was even\n");
17            }
18        }
19        return 0;
20    }
18    static char * __phi__fname = __FILE__;
19    #define __PHI__MAX (5+1)
20    #include "phicases.c"
```

These examples show the insertion of the __phi__block instrumentation immediately after the opening brace ("{") of the block, but depending upon the specific parser used for the instrumentation, the instrumentation may be placed at any location between the opening brace and the first executable statement in the block.

Assume that the first sequence of testing consists simply of one test case, the number 1 (after which the input is terminated by receipt of "end-of-file"). This will cause execution of the chunks numbered 1, 2, 3, and 4. Before executing this first test, the previous coverage results file, "example2.pho", does not exist. Therefore, each time that a _phi_block or _phi_test function is reached for the first time, it results in the writing of one line in the incremental coverage results file "example2.phi". At the conclusion of testing, the file "example2.pho" looks like this:

+++#1 MAR 31, 1995 13:45 plum c:\demos and the file "example2.phi" looks like this:

| 1 | 4  | B |                      |
|---|----|---|----------------------|
|   |    |   | c:\demos\example2.c N=5 |
| 3 | 7  | T |                      |
| 4 | 13 | B |                      |
| 2 | 7  | F |                      |

(Note that the first time a source file name is written into the incremental coverage results file it is necessary to also write an indication of the total number of chunks in that source file —five chunks, in this example —so that when that incremental coverage results file is re-read subsequently, the internal tables for recording coverage can be initialized prior to further execution of the instrumented executable program.)

Continuing the example further, the second time that the instrumented executable is tested, when the control flow reaches the first _phi_block or _phi_test function invocation, the run-time instrumentation will first prepare for incremental coverage testing:

1. Catenate any existing "example2.phi" file onto the end of an existing "example2.pho" file. Write an invocation timestamp onto the end of the "example2.pho" file.
2. Remove any existing "example2.phi" file.
3. Read the "example2.pho" file line-by-line. For each line: Disregard commentary lines. If the line contains a file name and an "N=" specification, allocate a coverage table using the malloc system function, one which is large enough to record a one-byte coverage result for each of the chunks for the specified source file. Disregard any erroneous lines.

In the second test execution of the instrumented example program, this processing will take place during the invocation of the _phi_block at chunk 1, the initial chunk for "example2.c". The status flags will be marked with "coverage already achieved" (e.g. the integer value 1) for chunks 1, 2, 3, and 4. Assume then that this second test execution provides only one input value, the integer value 2. After reading this input value, the instrumented executable will reach chunk 2. The run-time coverage tests that were inserted by the instrumenter 200 will note that coverage of chunk 2 has already been achieved, and no output results. Next the instrumented executable will reach chunk 5. The run-time coverage tests that were inserted by the instrumenter 200 will note that coverage of chunk 5 has not already been achieved, and one more coverage message will be produced on the output file "example2.phi". Therefore, after this second execution the resulting "example2.pho" output file will look something like this +++#2 MAR 31, 1995 13:55 plum c:\demos
and the resulting "example2.phi" output file will look something like this:

5 16 B c:\demos\example2.c N=5

See Figure for a flow chart summarizing the instrumentation process.

Audible Confirmation of Incremental Coverage

The process of testing can be accelerated by giving the human test engineer an audible confirmation of reaching a point of incremental coverage. In an environment such as MS Windows, in which specific sounds can be attached to different events, a distinctive sound can be associated with the attainment of a point of incremental coverage.

Use of Results from Incremental Coverage to
Guide Production of Optimized Instrumented
Applications Generation of incremental coverage results produces much less test-coverage output than generating full-coverage output. Still, the instrumented executable must execute some extra instructions at the beginning of each chunk of code. We use the results from prior coverage testing to build a more efficient executable, as follows:

At each chunk of code at which coverage instrumentation would ordinarily be generated, we ask whether all possible outcomes have already been observed.

For a 'B' (block) chunk, there is only one outcome required, i.e. simply reaching this point in the flow of control. If the chunk has been previously reached by an executed test case, then the coverage instrumentation can be omitted in an optimized executable.

For an 'F' chunk or a 'T' chunk (outcomes of a condition), if both chunks in the pair have been previously reached by executed test cases, then the coverage instrumentation can be omitted in an optimized executable.

Figure 9:
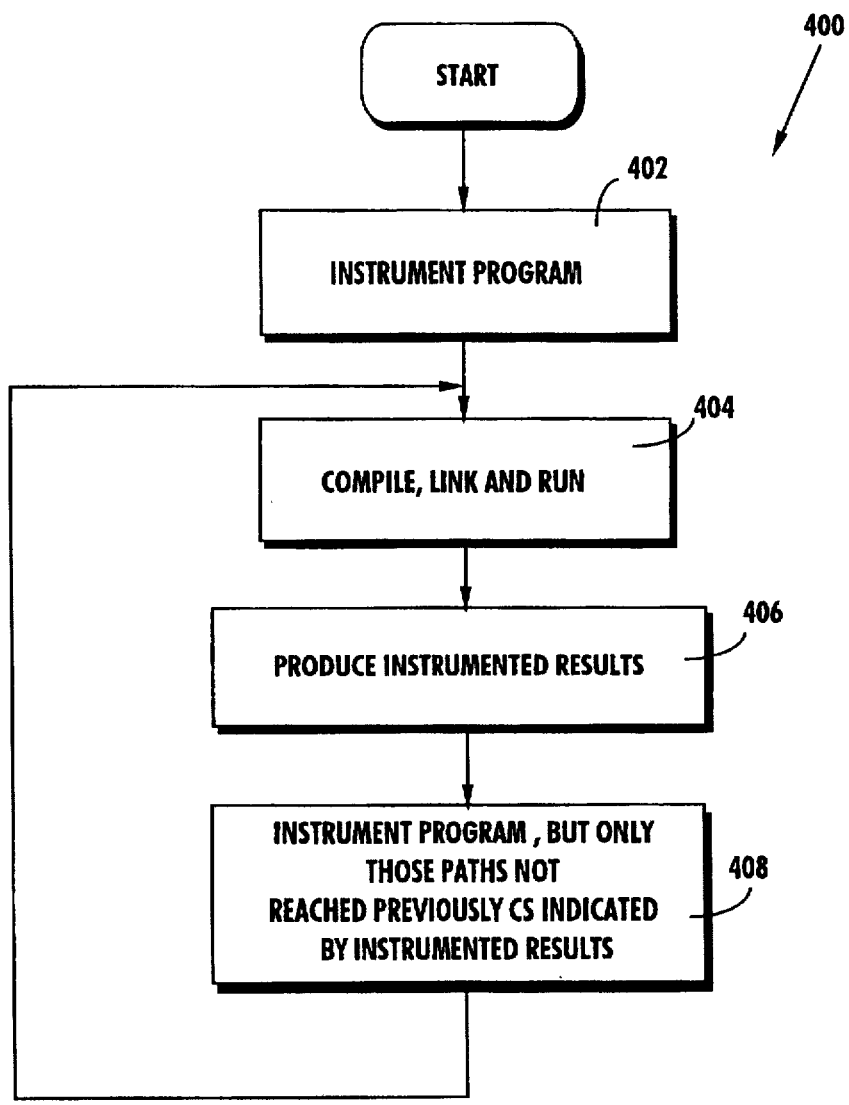
FIG. 9 shows an example iterative optimized efficiency instrumentation/testing process.

Specifically, this example consists of a modification to the Instrumentation techniques discussed above to provide a degree of iteration:

source ---> INSTRUMENTER ---> instrumented program
program +
previous
coverage
results FIG. 9 blocks 402–408 show how this interative process may be performed. For example, assume that the following program is the input source program, "example3.c".

| 1  | #include <stdio.h>                              |
|----|-------------------------------------------------|
| 2  |                                                 |
| 3  | int state = '?';                                |
| 4  | int main( )                                     |
| 5  | {                                               |
|    | ^                                               |
|    | 1                                               |
| 6  | int number;                                     |
| 7  | printf("example3:\n");                          |
| 8  | while (scanf("%d", &number) == 1)               |
|    | ^               ^                               |
|    | 2               3                               |
| 9  | {                                               |
| 10 | int number_is_even = (number % 2 == 0);         |
| 11 | if (state == 'e' && number_is_even)             |
|    | ^                                 ^             |
|    | 4                                 5             |
| 12 | printf("two evens in a row\n");                 |
| 13 | if (number_is_even)                             |
|    | ^               ^                               |
|    | 6               7                               |
| 14 | state ='e';                                     |
| 15 | else                                            |
| 16 | state ='o';                                     |
| 17 | }                                               |
| 18 | return 0;                                       |
| 19 | }                                               |

Assume that the first sequence of testing consists simply of one test case, the number 1 (after which the input is terminated by receipt of "end-of-file"). This will cause execution of the chunks numbered 1, 3, 4 and 6. Chunk 1 is a 'B' chunk, so an optimized executable can omit the instrumentation for chunk 1, because it has already been reached. Chunks 2 and 3 constitute a matching pair of conditional chunks; both have been reached, so an optimized executable can omit the instrumentation for chunks 2 and 3 (see FIG. 9, block 408). Therefore, this example produces an executable which is instrumented only for chunks 4, 5, 6, and 7 (e.g., FIG. 9, block 404). This process can continue iteratively—thereby gradually reducing the amount of instrument code in the instrumented program as more and more test cases are used.

As the number of chunks reached through testing increases, the number of chunks requiring instrumentation decreases, so that the efficiency of the instrumented executable approaches the efficiency of the uninstrumented executable. In this way, the penalty for instrumentation can be greatly diminished.

Use of Coverage Results to Estimate Testing Time

A useful measure of the reliability of software being tested is the ratio of the number of defects revealed by testing to the total amount of time spent testing the software. The instrumented executable created by this invention provides a simple way to estimate the testing time using the information lines written to the cumulative results file. Each information line includes the date and time at which the program was executed; by comparing successive information lines, one can estimate the elapsed time of a particular execution of the program, as follows. If the difference between the two times is less than or equal to some standard interval (say, 30 minutes), use that difference as the elapsed time; otherwise, estimate the elapsed time for that test as being equal to that standard interval. These estimates can be summed for a particular series of executions (represented by a particular cumulative results file) and combined with the number of defects found during the tests (which must be noted separately by the programmer) to obtain the rate of new defects discovered per unit of testing time.

Use of Comments in Source File to Mark Untestworthy Chunks

It is often the case that not every chunk of a program needs to be reached in order for the program to be considered adequately tested. Certain conditions that must be allowed for in the program may be extremely difficult to simulate during testing (the exhaustion of available memory or disk file space, for example) or may result from system interface requirements that represent failures in the environment that are not under the tester's control. These include "cookbook" code sequences that are included because the "standard" method of programming for an environment requires them. This invention provides a way for the programmer to mark such chunks in a program as being "untestworthy" or not significant for testing purposes by including a comment in the source file for the program. This comment is of the form

/* UT */ and must be positioned at the first character position of each chunk which is to be so marked. (This character position is the point at which instrumentation code is inserted, as described in Method 1.) If the C/C++ parser module which analyzes the source code detects an untestworthy comment at the position of a chunk, it records that information along with the chunk position. Then, when coverage results are tabulated, those chunks which are marked as untestworthy are listed on the report and do not affect the computation of the percentage of (testworthy) chunks which have been reached as a result of testing. On the other hand, test runs in which untestworthy chunks actually are reached should be reported and emphasized in output summaries.

Coverage of Boundary Cases

In the art of software testing, it is often important to know whether some limit has been exactly reached or just barely exceeded. For example, if a program contains this test for an integer variable n if (n<10)

then there are four significant cases:

1. n equals 10 exactly;
2. n is just less than 10 (i.e. n equals 9);
3. n is greater than 10;
4. n is less than 10 (and less than 9 too).

A thorough test which probes all boundary values will contain one or more tests that reach each of these four significant cases.

Therefore, this example technique provides a modification of the instrumenter 200 described above in which each 'T' or 'F' chunk from a conditional or equality test can have two alternative outcomes, "exactly equal to this limit value" or "not exactly equal to this limit value". (In some cases, the specified limit value is the largest or smallest possible value for the data type of the comparison, in which case that 'T' or 'F' outcome has only one possible value.)

Use of Coverage Results File to Indicate Exceptional Chunks

As noted in the description above, when an instrumented program begins execution, it reads the cumulative results file in order to determine what chunks have already been reached by prior executions. According to this method, the cumulative results file may also contain a list of chunks which have not yet been reached but which are of special interest for testing purposes. These "exceptional" chunks may represent portions of the program which handle unusual or exceptional conditions that indicate problems that may be difficult to test. Such a list of exceptional chunks is indicated in the cumulative results file by the special comment

+EXCEPTIONAL which must precede the chunks to be interpreted as exceptional. When such a comment is encountered, the usual interpretation of a coverage result line as representing a chunk which has already been tested is changed: now such a line represents a chunk which has not been tested (and all chunks not included in the list are assumed to be tested). This interpretation continues until either the end of the cumulative results file is encountered, or an information line indicating a new execution of the program is encountered. After that information line, subsequent results lines are interpreted in the usual sense (unless again preceded by the +EXCEPTIONAL comment).

This method is useful in two ways. First, for programs which have been fairly thoroughly tested, it allows the creation of a cumulative results file which is much smaller than that which would be needed if all of the previously tested chunks were listed, rather than the untested chunks. Second, it allows a programmer to specify a list of chunks which are of particular interest for a specific sets of tests designed to determine how well that program handles unusual or exceptional conditions. In such a case, it may be that the resulting output from the program (when those exceptional chunks are reached) can be of assistance in debugging a problem which occurs at a remote user's site.

Use of Instrumented Application for Diagnostic Purpose

The aforementioned table of coverage information can be used to provide benefits that continue, beyond the testing phase, on into post-release uses of the product. Certain chunks within the program can be marked by the application programmer as "trouble situations". In such chunks, the program is responding to erroneous or difficult situations. Assume that the programmer has identified N specific chunks of the application as trouble chunks, such as by listing them as "EXCEPTIONAL" chunks of instrumenter above.

Further assume that the application is packaged and distributed in two versions, the Production Version and the Diagnostic Version. If the end user encounters some failure in the operation of application A, let the user execute an associated mode-setting program, such as the WhatsWrongNow(tm) application from Plum Hall. Such mode-setting program will execute "move" or "rename" commands on the end-user's computer so as to substitute the Diagnostic Version of the application in place of the Production Version. After executing such mode-setting program, the diagnostic mode of the application will create the log of the chunks reached. Such mode-setting program will also examine the log of chunks reached to determine where the application got into trouble.

APPENDIX—DETAILED EXAMPLE

The following is an illustrative example of an "example1.c" source program:

```
/* demo_1 - trivial program */
#include <stdio.h>
int main(int argc, char *argv[])
{
    int n = argc - 1;
    printf("demo_1 . . . \n");
    switch (n)
    {
    case 1:
        printf("1");
        break;
    }
    while (n == 1)
    {
        printf(" again");
        n = 0;
    }
    printf("\n");
    return 0;
}
```

The example instrumenter 200 provided by this invention can produce the instrumented version of "example1.c", with calls to the instrumentation functions _phi_test and _phi_block inserted, and certain bookkeeping information appended. In this simple example, the entire project consists only of the one source file named "example1.c". Therefore, certain project-wide information is also appended to the instrumented file, as shown below:

```
/* demo_1 - trivial program */
#include <stdio.h>
#include "C:\PLUMHALL\SQS\phicases.h"
int main(int argc, char *argv[])
{
    int n = argc - 1;
    int __plumhall_1 = __phi_block(1, __LINE__);
    printf("demo_1 . . . \n");
    switch (n)
    {
    case 1:
        __phi_block(2, __LINE__); printf("1");
        break;
    }
    while (__phi_test(3, __LINE__, 0!=(n == 1)))
    {
        printf(" again");
        n = 0;
    }
    printf("\n");
    return 0;
}
static char * __phi_fname =
"c:\\demos\\plumhall\\example1.c";
#define __PHI_MAX (4+1)
#include "C:\PLUMHALL\SQS\phicases.c"
#define CURRENT_RESULTS_FILE_NAME
"C:\\DEMOS\\PLUMHALL\\EXAMPLE1.PHI"
#define ACCUMULATED_RESULTS_FILE_NAME
"C:\\DEMOS\\PLUMHALL\\EXAMPLE1.PHO"
#define ERROR_RESULTS_FILE_NAME
"C:\\DEMOS\\PLUMHALL\\EXAMPLE1.PHE"
#define NUMBER_OF_SOURCE_FILES 1
static char __file1[34] = "c:\\demos\\plumhall\\example1.c";
static char *__source_file_list
[NUMBER_OF_SOURCE_FILES] = {
    _file1,
};
static int __case_counts[NUMBER_OF_SOURCE_FILES] = {
    5,
};
static void __phi_unit_tests(void)
```

Note that the instrumentation has inserted three "#include" directives into the instrumented program, which cause the inclusion of the following three other files: "phicases.h", "phicases.c", and "phiglobx.c".

Here is an example "phicases.h" file:

```
/* Coverage instrumentation header file. */
#ifndef PHICASES_H
#define PHICASES_H 1
#include <stdio.h>
void __phi_reached(int cas, int line, char truth, char *fname, int ncases);
char *__phi_alloc(int cas, int line, char truth, char *fname, int ncases);
void __phi_reset_cases(char *fname);
void __phi_exit(void);
static char *__phi_cases /* =0 */;
static int __phi_test(int cas, int line, int expr);
static int __phi_block(int cas, int line);
#endif /* PHICASES_H */
```

Here is an example "phicases.c" file:

```
/* static functions for coverage implementation */
static int __phi_test(int cas, int line, int expr)
{
    char truth;
    if (0!=expr)
        ++cas;
    if (__phi_cases && __phi_cases[cas] != 0)
        return expr;
    truth = (0!=expr) ? 'T' : 'F';
    if (!__phi_cases)
```

```
        {
        _phi_cases = _phi_alloc(cas, line, truth,
            _phi_fname,
    _PHI_MAX);
        }
    else
        {
        _phi_cases[cas] = 1;
        _phi_reached(cas, line, truth, _phi_fname, 0);
        }
    return expr;
    }
static int _phi_block(int cas, int line)
    {
    if (_phi_cases && _phi_cases[cas] != 0)
        return 0;
    if(!_phi_cases)
        {
        _phi_cases = _phi_alloc(cas, line, 'B',
            _phi_fname,
    _PHI_MAX);
        }
    else
        {
        _phi_cases[cas] = 1;
        _phi_reached(cas, line, 'B', _phi_fname, 0);
        }
    return 0;
    }
```

And the remaining pages contain the "phiglobx.c" file. When the instrumented "example1.c" file is compiled, the "#include" directives cause the other three files to be included in the compilation. The resulting compiled program embodies the behaviors described in the methods above.

```
/* Globals for coverage implementation. */
#include <stdlib.h>
#include <string.h>
#include <time.h>
#include <conio.h>
#ifdef _TURBOC_
#include <dir.h>
#define _inp inp
#define _outp outp
#define _getcwd getcwd
#define _stricmp stricmp
#ifdef _Windows
#define _WINDOWS 1
#endif
#else
#include <direct.h>
#endif
#ifdef _WINDOWS
#include <windows.h>
#endif
static char _out_name[] = CURRENT_RESULTS_FILE_NAME;
static char _log_name[] =
ACCUMULATED_RESULTS_FILE_NAME;
static char _err_name[] = ERROR_RESULTS_FILE_NAME;
static FILE *_test_out = 0;
static int _initialized = 0;
/* emit audible sound for new chunk reached */
static void _phi_beep(void)
    {
#ifndef _WINDOWS
    int control;
    clock_t goal;
    _outp(0x43, 0xb6);   /* prepare timer by sending 10111100 to port 43 */
    _outp(0x42, 0x36);   /* these values generate 750 Hz tone */
    _outp(0x42, 0x06);
    control = _inp(0x61);   /* get speaker control byte */
    _outp(0x61, control|3);   /* turn on speaker (bits 0 and 1) */
    goal = clock( ) + 50;
    while (goal >= clock( ))   /* wait for 50 ticks */
        ;
    _outp(0x61, control);   /* turn off speaker */
#else
    MessageBeep((UINT)-1);   /* generate beep for new chunk */
#endif
```

While the above description focuses on C and C++ programs, the techniques described here can be extended to programs written in another programming language, provided that that language meets the following two criteria. First, the language should specify the sequence of execution of a program, with the flow of control determined by function or procedure calls and various conditional tests. Second, because the instrumentation technique used by this method relies on the validity of replacing the expression in a conditional test with a function call to an instrumentation function (such as the _phi_block or _phi_test functions described above), such a replacement should be legal in the programming language which is being used to develop the program, and it must not affect the meaning of the program, i.e., the replacement must not change the logic of the program in any way. Programs written in any language which meets these requirements can be instrumented in a way similar to that which is described for this method. The nature of the instrumentation code which is added, of course, will depend on the specific language, and determining the positions at which that code will be inserted into the original program requires the use of at least a subset of a parser for that programming language.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A computer program testing method for producing incremental coverage information indicating which portions of a computer program have been exercised, the method including the steps of:

instrumenting the computer program to provide an instrumented computer program; and executing the instrumented computer program to exercise portions of the instrumented computer program, including the step of producing incremental coverage output indicating exercised portions of the instrumented computer program which were unreached by at least one previous execution of the instrumented computer program, the incremental coverage results being provided without requiring the instrumenting step to be repeated subsequent to said previous execution.

2. A method of software testing as in claim 1 further including the step of producing an audible feedback indicating in an immediately audibly perceptible form that the executing step has reached a previously-unreached part of the instrumented computer program.

3. A method as in claim 1 wherein the executing step includes the step of dynamically comparing current coverage information with a record of instrumented computer program portions exercised by previous execution of the instrumented computer program.

4. A method as in claim 3 wherein the record includes plural entries, each entry corresponding to a chunk in the instrumented computer program, each entry having a state indicating whether the corresponding chunk has been executed; and the executing step includes the step of updating the record to include a record of instrumented computer program chunks exercised by a current execution of the instrumented computer program.

5. A method as in claim 1 wherein the instrumenting step includes the step of inserting instrumentation code that tests for each of multiple alternative outcomes of at least one branch within the computer program.

6. A method of software testing including the following steps:

(a) maintaining a data structure indicating whether each of plural software paths has been exercised by testing;

(b) upon reaching a path, checking the data structure to determine whether the path has previously been exercised; and (c) if the checking step reveals that the path has not previously been exercised, modifying the data structure to indicate that the path has been exercised and writing an indication into an output data structure indicating the path.

7. A method as in claim 6 wherein step (c) further includes the step of providing a sensible indication to a human being.

8. A method as in claim 6 wherein step (c) further includes providing an audible indication that a path not previously reached has now been exercised.

9. A method as in claim 6 further including the step of effectively deleting instrument code from the program in response to the output data structure.

10. A method as in claim 6 wherein step (c) is conditioned on determining whether the path is selected for testing.

11. A method as in claim 6 wherein step (c) is conditioned on determining whether the path is not deselected for testing.

12. A method as in claim 6 wherein step (c) includes the step of indicating whether the exercised path is exceptional.

13. A method of iterative software testing comprising:

(a) instrumenting a computer program having at least one branch with multiple alternative outcomes, including the step of inserting instrumentation code into the computer program that tests for each of the multiple alternative outcomes of the branch;

(b) executing the instrumented computer program to provide branch coverage results; and (c) repeating step (a) in response to the branch coverage results, including the step of omitting at least some instrumentation code inserted by an earlier performance of step (a) based on the branch coverage results indicating that at least one portion of the program has been exercised.

14. A method as in claim 13 wherein the executing step includes the step of dynamically comparing current coverage information with a record of instrumented computer program portions exercised by previous execution of the instrumented computer program to provide incremental coverage information.

15. A method as in claim 14 wherein the record includes plural entries, each entry corresponding to a chunk in the instrumented computer program, each entry having a state indicating whether the corresponding chunk has been executed; and the executing step includes updating the record to include a record of instrumented computer program chunks exercised by a current execution of the instrumented computer program.

16. A method of software testing including the steps of:

(a) automatically parsing a computer program to locate at least one inline template and/or member function defined inline within at least one template class, wherein the inline function is defined within a header file; and (b) automatically inserting, into said header file, instrument code to provide at least one coverage evaluation function.

17. A method as in claim 16 further including the step of executing the computer program while dynamically comparing current coverage information generated based on the inserted instrumentation code, with a record of computer program portions exercised by previous execution of the computer program.

18. A method as in claim 17 wherein the record includes plural entries, each entry corresponding to a chunk in the computer program, each entry having a state indicating whether the corresponding chunk has been executed; and the executing step includes updating the record to include computer program chunks exercised by a current execution of the computer program.

19. A method as in claim 16 further including the step of inserting instrumentation code that tests for each of multiple alternative outcomes of at least one branch within the computer program.

20. A method of software testing comprising:

(a) parsing a computer program to locate at least one inline function;

(b) compiling the computer program, including the step of expanding the inline function to include instrumentation code; and (c) executing the compiled computer program, including the step of generating incremental coverage information.

21. Software testing apparatus comprising:

an instrumenter that accepts a computer program as an input, parses the computer program to locate at least one insertion point, and inserts instrument code at the insertion point to provide an instrumented computer program; and an executor that executes the instrumented computer program and generates incremental coverage results in response to the inserted instrument code, the incremental coverage results indicating exercised portions of the instrumented computer program that were unreached by at least one previous execution of the instrumented computer program, the incremental coverage results being provided without requiring the instrumenter to re-instrument the computer program subsequent to said previous execution.

22. Apparatus as in claim 21 wherein the executor dynamically compares current coverage information with a record of instrumented computer program portions exercised by previous execution of the instrumented computer program.

23. Apparatus as in claim 22 wherein the record includes plural entries, each entry corresponding to a chunk in the instrumented computer program, each entry having a state indicating whether the corresponding chunk has been executed; and the executor updates the record to include instrumented computer program chunks exercised by a current execution of the instrumented computer program.

24. A method as in claim 21 wherein the instrumenter inserts instrumentation code that tests for each of multiple alternative outcomes of at least one branch within the computer program.

25. Software testing apparatus comprising:

instrumenting means including inputting means for accepting a computer program as an input, parsing means for parsing the computer program to locate at least one insertion point, and inserting means for inserting instrumentation code at the insertion point to provide an instrumented version of the computer program; and executing means coupled to the instrumenting means, the executing means for executing the instrumented version of the computer program, the executing means including outputting means for outputting at least incremental coverage results indicating exercised portions of the instrumented computer program that were unreached by at least one previous execution of the instrumented computer program version, the incremental coverage results being provided without requiring the instrumenting means to re-instrument the computer program subsequent to said previous execution.

26. A storage medium comprising:

means for storing an instrumented executable computer program defining plural paths;

means for storing a data structure indicating which of the plural paths have been exercised; and means for storing a further data structure indicating which of the plural paths were exercised by the most recent execution of the computer program and which were not exercised by at least one previous execution of the computer program.

27. A storage medium as in claim 26 wherein the means for storing an instrumented executable computer program includes means for storing at least one instrumentation function that dynamically compares current coverage information with the data structure indicating which of the plural paths have been exercised.

28. A storage medium as in claim 27 wherein the means for storing the data structure indicating which of the plural paths have been exercised includes means for storing a record including plural entries, each entry corresponding to a path in the instrumented computer program, each entry having a state indicating whether the corresponding path has been executed; and the instrumentation function storing means includes means for storing executable code that updates the record to include instrumented computer program paths exercised by a current execution of the instrumented computer program.

29. A storage medium as in claim 26 wherein the instrumenting step includes the step of inserting instrumentation code that tests for each of multiple alternative outcomes of at least one branch within the computer program.

* * * * *